US007034827B2

(12) United States Patent
Hurley et al.

(10) Patent No.: US 7,034,827 B2
(45) Date of Patent: Apr. 25, 2006

(54) EXTENSION OF FAST PHONG SHADING TECHNIQUE FOR BUMP MAPPING

(75) Inventors: James T. Hurley, Pleasanton, CA (US); Fedor A. Pletenev, Nizhny Novyorod R. (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/118,945

(22) Filed: Jul. 17, 1998

(65) Prior Publication Data

US 2001/0045956 A1    Nov. 29, 2001

(51) Int. Cl.
*G06T 15/50* (2006.01)
(52) U.S. Cl. ...................... 345/426; 345/584
(58) Field of Classification Search ............... 345/426, 345/430, 584
See application file for complete search history.

(56) References Cited

U.S. PATENT DOCUMENTS

| | | | | |
|---|---|---|---|---|
| 4,709,231 A * | 11/1987 | Sakaibara et al. | ........... | 345/426 |
| 4,943,938 A * | 7/1990 | Aoshima et al. | ............ | 345/422 |
| 5,905,503 A * | 5/1999 | Penna | ......................... | 345/426 |
| 5,949,424 A * | 9/1999 | Cabral et al. | ................ | 345/426 |
| 6,175,368 B1 * | 1/2001 | Aleksic et al. | ............... | 345/430 |

OTHER PUBLICATIONS

Autodesk, Inc., "Using 3D Studio MAX", 3D Studio MAX, pp. 2-1-2-30, Mar. 1996.*

Miller et al., On-the-Fly Texture Computation for Real-Time Surface Shading, IEEE, Mar./Apr. 1998, pp. 44-58.*
Claussen, Ute, "On Reducing the Phong Shading Method", *EUROGRAPHICS '89*, Eurographics Association, 1989, pp. 333-344.
Kuijk, A.A.M., et al., "Faster Phong Shading via Angular Interpolation", *Computer Graphics Forum 8*, 1989, pp. 315-324.
Duff, Tom, New York Institute of Technology, "Smoothly Shaded Renderings of Polyhedral Objects on Raster Displays", *ACM*, 1979, pp. 270-275.
Bishop, Gary et al., AT&T Bell Laboratories, "Fast Phong Shading", *ACM*, Nov. 4, 1986, vol. 20, pp. 140-106.

* cited by examiner

*Primary Examiner*—Sumati Lefkowitz
*Assistant Examiner*—Motilewa Good-Johnson
(74) *Attorney, Agent, or Firm*—Blakely, Sokoloff, Taylor & Zafman LLP

(57) ABSTRACT

A method for implementing bump mapping is provided that is fast enough to be used with real time interactive graphics products. Computationally expensive color values are pre-calculated for a sample of normal vector orientations as a function of orientation-dependent color variables, collected in a color map, and referenced through the color variables. The color variables are linearly related to angle coordinates that specify the normal vector orientations in a selected coordinate system. Angle coordinates are determined for the vertices of the polygons representing the object to be imaged. During rendering, the vertex angle coordinates are interpolated to provide pixel angle coordinates. Modified angle coordinates are generated by combining the angle coordinates with angle perturbations provided by a perturbation source, and converted to color variables. Color values referenced by the color variables are assigned to the corresponding pixels.

21 Claims, 10 Drawing Sheets

(A)　　　　　　　(B)
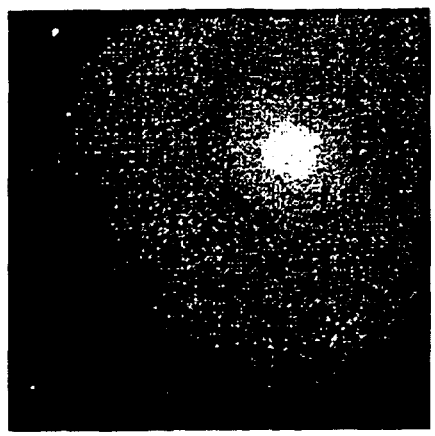 
$c^1$　　　　　　　$c^2$
(C)　　　　　　　(D)
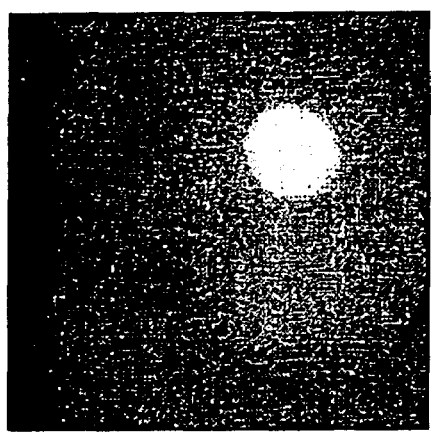 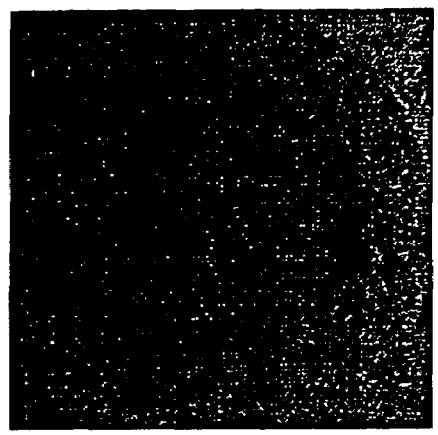
$c^1$　　　　　　　$c^2$
FIG. 5

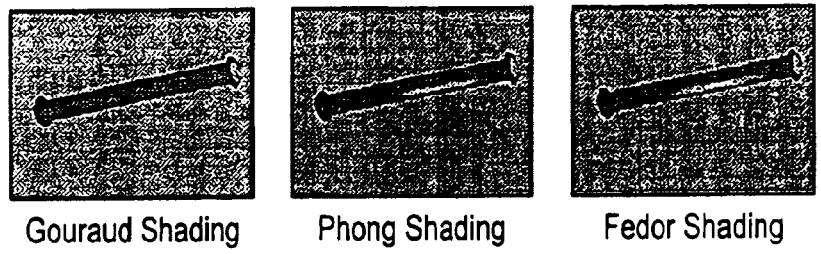
FIG. 6A  Gouraud Shading / Phong Shading / Fedor Shading
FIG. 6B  Gouraud Shading / Phong Shading / Fedor Shading
FIG. 6C  Gouraud Shading / Phong Shading / Fedor Shading
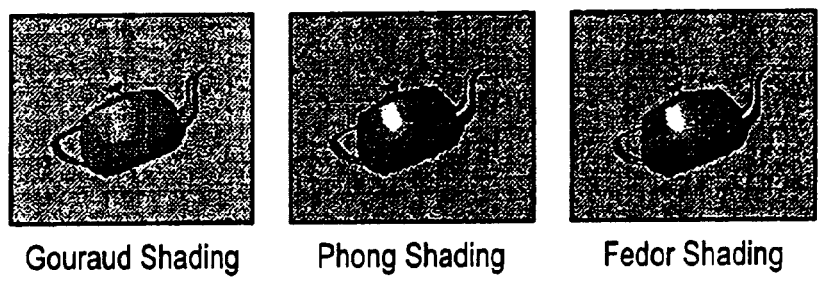
FIG. 6D  Gouraud Shading / Phong Shading / Fedor Shading
FIG. 6E  Gouraud Shading / Phong Shading / Fedor Shading

EXTENSION OF FAST PHONG SHADING TECHNIQUE FOR BUMP MAPPING

This patent application is related to U.S. patent application Ser. No. 09/118,581, entitled "System and Method for Fast Phong Shading".

BACKGROUND OF THE INVENTION

1. Technical Field

This invention relates to the field of computer graphics, and in particular to methods for implementing bump mapping in computer graphics.

2. Background Art

Computer images having realistic three dimensional appearances ("3D images") are becoming increasingly prevalent in games, multi-media, and other graphics-heavy software. The methods employed to generate 3D images require processing power that has only recently become available in personal computers. A standard method for generating a 3D image begins with sets of polygons that represent the surfaces of each object in the image. An object that has a moderately complex shape may require thousands of polygons to represent its surface, and an image that includes multiple objects may require tens or even hundreds of thousands of polygons. Illumination and orientation data for each of these polygons must be processed and converted to pixel level data to generate a 3D image on a computer monitor. A computer may have to process 50 million pixels (≈0.5 million polygons) per second to generate a 3D image that includes multiple objects of moderate complexity. This places a significant burden on the processing power of the computer.

Image processing is implemented by a 3D pipeline that typically includes a geometry stage and a rendering stage. In the geometry stage, the orientation of each polygon and the location of any light sources that illuminate the polygon are determined with respect to a reference coordinate system and specified by vectors associated with the polygon's vertices. This vertex data is transformed to a coordinate system ("camera coordinate system") that facilitates viewing the image on a computer monitor and rotated to a desired orientation. In the rendering stage, the vertex data for each polygon is converted into the pixel level data necessary to represent the object on the computer monitor. Since there are tens to hundreds of pixels per polygon, rendering significantly slows the image generation process.

The two dimensional (2D) image on the computer monitor obtains its 3D appearance through lighting and perspective effects implemented by the graphics pipeline. The 3D appearance of an object depends significantly on the shading method used to assign color values to the pixels of the polygons. Realistic 3D images require relatively sophisticated shading methods that determine color values on a pixel by pixel basis. Consequently, these shading methods are implemented during the rendering stage of the pipeline.

The principal shading methods are, in order of increasing sophistication, flat shading, Gouraud shading, and Phong shading. Flat shading assigns the same color values to all the pixels in a polygon. Gouraud shading assigns color values to the pixels by interpolating from the color values at the vertices of the polygon. Phong shading assigns color values by interpolating a normal vector for each pixel from the normal vectors at the polygon vertices, and evaluating an illumination equation at each pixel using its interpolated normal vector. Phong shading and its variants are referred to as per-pixel shading methods, since the colors of an image are calculated for each pixel according to its orientation characteristics. These per pixel orientation characteristics are also necessary to implement bump mapping, which generates modified lighting features by perturbing the surface normal from its interpolated value.

Systems that generate fast, interactive graphics typically employ flat and Gouraud shading. These methods employ approximations in the rendering stage that are relatively cheap computationally, and the corresponding images can be generated in real time without elaborate graphics hardware. The images produced by these methods lack the lighting effects that distinguish quality 3D images, such as realistic specular highlights and diffuse light scattering. In addition, these methods are not amenable to bump mapping, since per pixel normal orientations are never determined. High end computer systems may include advanced rendering hardware to implement Phong shading. Even with high quality graphics hardware, the computational cost of Phong shading makes it difficult to generate real-time, interactive 3D images.

There is thus the need for a practical implementation of per-pixel shading methods that are suitable for use in real-time, interactive 3D graphics applications and may be implemented without the need for sophisticated graphics hardware.

SUMMARY OF THE INVENTION

The present invention provides per-pixel shading that is fast enough for real time interactive graphics applications and may be implemented using standard graphics hardware.

In accordance with the present invention, color values are precalculated, collected in a color map, and referenced by orientation-dependent color variables. During rendering, per-pixel vector orientations are determined, modified according to a perturbation source, mapped to color variables through a pair of angular coordinates, and pixel color values are provided by a corresponding entry in the color map.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

FIGS. 5A–5D are examples of color maps generated using the method of the present invention.

FIGS. 6A–6E are images generated using Gouraud shading, Phong shading, and the method of the present invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, and components have not been described in detail in order to focus attention on the features of the present invention.

Figure 1:
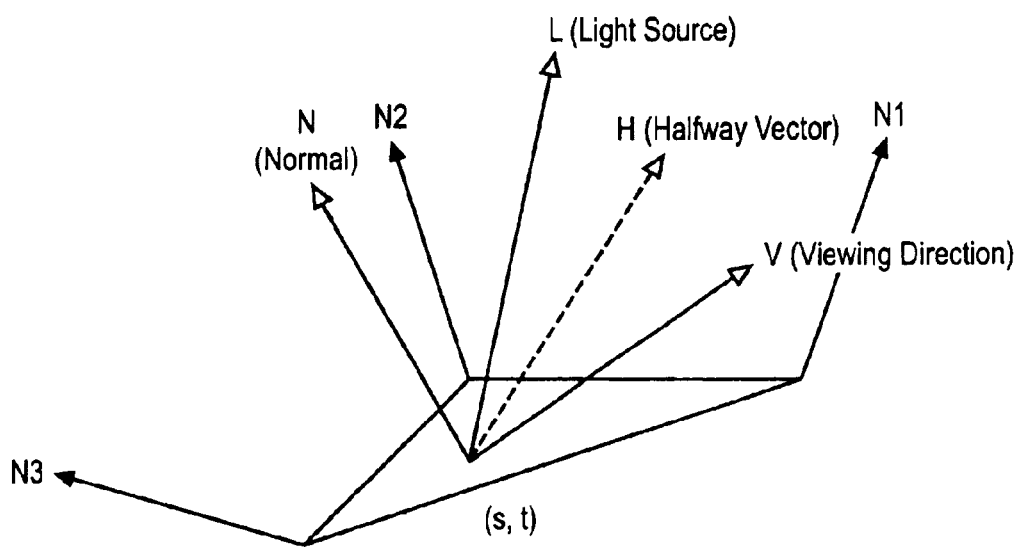
FIG. 1 is shows the different vectors associated with a polygon to determine color values for the pixels of the polygon.

FIG. 1 shows the different vectors that are associated with a polygon P for implementing various illumination models. In the following discussion, vectors and matrices are represented by bold capital letters. P is shown as a triangle for purposes of illustration with the understanding that any type of convex, planar polygon may be used to approximate the surface of an object. Vectors N, L, V, and H are shown for an arbitrary set of surface coordinates (s, t) on P. N is a unit vector that is normal to P at (s, t). L is a unit vector at (s, t) that points toward a light source illuminating P. V is a unit vector at (s, t) that points in the direction from which the object is viewed, e.g. the viewing or camera direction. H is a vector that is halfway between L and V. When normalized, H is given by $(V+L)/|V+L|$. H is convenient for determining the specular component of light at a surface location.

The three vertices of P are characterized by unit normals N1, N2, N3. These normals indicate the orientation of P at each vertex and are specified by a set of cartesian coordinates $(n_x, n_y, n_z)$. The vertex normals may be generated in the geometry stage of a graphics pipeline or, more typically, provided with a model of the object. Although not shown in FIG. 1, the vertices of P may also be characterized by values of L and V.

In Phong-type per-pixel shading methods, the orientations of vectors N, L, and H are estimated for each pixel from their corresponding vertex values. An illumination model is evaluated at each pixel using the estimated vectors, and the resulting color value is assigned to the pixel for display on the computer monitor.

Equation (I) is representative of the illumination equations used to determine the color value of a pixel at a location (s,t).

$$C(s,t) = \sum_{j=0}^{N-1} \left( \frac{M_a L_{aj} + M_d L_{dj}(N(s,t) \cdot L_j(s,t)) + M_s L_{sj}(N(s,t) \cdot H_j(s,t))^A}{D(s,t,j)} \right). \quad \text{Eq. (1)}$$

Here, $M_d$, $M_s$, and $M_a$ are characteristics of the object material for diffuse, specular, and ambient light, respectively, and $L_{dj}$, $L_{sj}$, and $L_{aj}$ are the diffuse, specular, and ambient components of light source, $L_j$ respectively. $D(s,t,j)$ is the distance between light source $L_j$ and the pixel at s,t, and A is the specular exponent of the material.

Using Eq. (1) to generate a 3D image requires the repetition of a number of costly operations for each pixel of the image. Ignoring various approximations, N, L, and H are estimated for each pixel from their corresponding vertex values. Eq. (1) is then evaluated for each pixel, using the estimated vectors. This entails evaluation of dot products (N·L and N·H), one of which is raised to a power (A). In addition, interpolation does not preserve the unit length of the normal, so that square root and division operations must be implemented for each pixel normal.

The computational overhead of Eq. (1) is thus large, and when implemented in the rendering stage of the graphics pipeline, makes real time interactive graphics impractical. This overhead can be reduced through various approximations. For example, cosine, square root, and inverse functions can be evaluated using look-up tables, which sacrifice accuracy for speed. The orientations of L and/or H can be treated as constant across the polygon, when the separation between the object and the light source or the viewer (camera) is relatively large. The object can be illuminated and viewed from the same direction, so that L and V (and thus L and H) are parallel, and N·L=N·H. This is a relatively common geometry in video games. Even with these strategies, Eq. (1) is still evaluated real time for each pixel, significantly slowing down the rendering process. The loss of accuracy can also produce noticeable defects in the resulting images.

The present invention provides per-pixel shading that is suitable for generating 3D images in real-time, interactive applications, using commonly available graphics hardware. This is accomplished by representing vector orientations through a pair of polar angle coordinates to simplify interpolation, scaling the angle coordinates to provide texture-like processing, and precalculating color values for a sample of normal vector orientations. The color values are parameterized by one or more angle-dependent color variables, collected in a color map, and referenced by their corresponding color variables. The color map needs to be recalculated only when the geometry with which the object is lit or viewed changes.

During rendering, angle coordinates of a vector, e.g. N, L, H, are determined for each pixel by interpolation from the values at the polygon vertices. Interpolation of the angle coordinates eliminates the need to renormalize the vector at each pixel. In addition, normal perturbations ("bumps") are readily incorporated into the rendering process in the form of perturbations to the angle coordinates. The angular coordinates (with or without perturbations) are converted to color variables, which map the vector orientations to a two dimensional array. The color variables reference illumination data in the color map that is appropriate for the relative light, camera, and normal vector orientations at the pixels. Thus, color values may be provided during the rendering stage using a relatively fast look-up procedure. This approach may be used to shade objects for any number of light sources, and it may be used whether the light source(s) are near the object (local) or "infinitely" distant from the object (non-local). It may also be used whether the camera is local or non-local.

Figure 2:
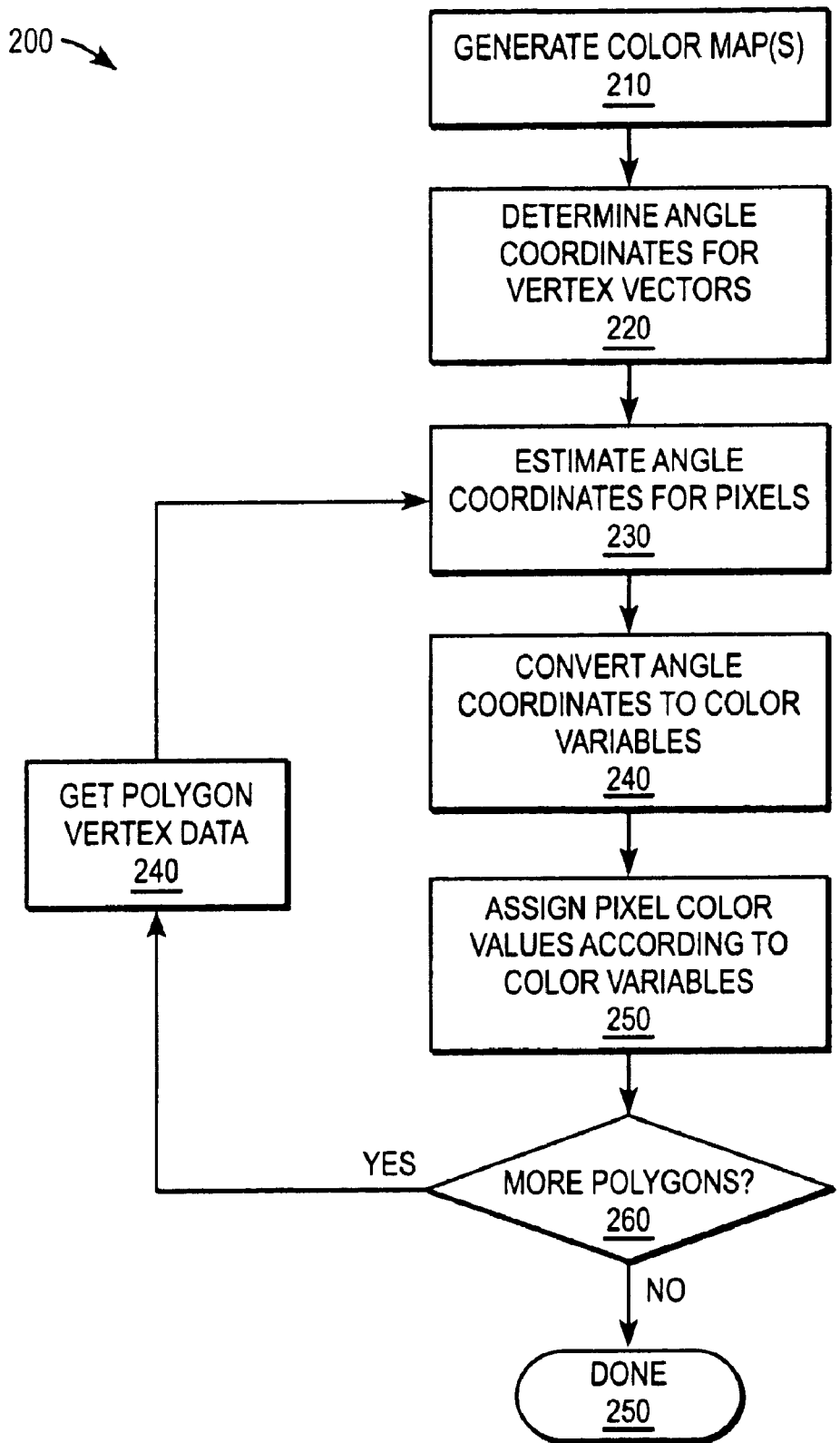
FIG. 2 is a flowchart representing an overview of a per-pixel shading method in accordance with the present invention.

FIG. 2 provides an overview of a method in accordance with the present invention for implementing per-pixel shading. At step 210, one or more color maps are generated, according to the properties of the object and the one or more light sources that illuminate it. Angle coordinates are then generated 220 for L, H, and N at the vertices of a polygon. Steps 210 and 220 are typically implemented prior to rendering. During rendering, angle coordinates are estimated 230 for the pixels of the polygon and converted 240 to color variables. A color value is assigned 250 to the pixel from the one or more color maps according to its color variable(s). If more polygons remain to be processed 260, vertex data for the next polygon is retrieved 270 and steps 230–260 are repeated. If no more polygons remain 260, processing for the object is done 270.

A detailed embodiment of the present invention is discussed first for the case in which the light source is non-local and the object is illuminated and viewed from the same direction (L and V are parallel). The modifications are then discussed for cases where V and L are not parallel and where multiple light sources are present. Finally, the modifications for the case of local light sources and cameras are discussed.

One feature of the present invention is the use of a two variable, polar coordinate system (angle coordinates) to represent vector orientations, instead of the conventional three variable, cartesian coordinate system. As noted above, the angle coordinates can be interpolated without altering the normalization of the corresponding vector, and they provide uniform coverage of vector orientations using linear interpolation methods. They also simplify specification of relative vector orientations. The angle coordinates are linearly related to orthogonal color variables that range between 0 and 1. The color variables reference color values in a precalculated color map in much the same way that texture variables reference texture values in a texture map.

For one embodiment of the invention, the angle coordinates of a normal vector are mapped to a two dimensional (2D) grid of color variables, and color values are assigned to pixels from a color map that is referenced to the same color variable grid. The color map for this embodiment may contain light contributions from one or more light sources. For non-local light sources, angle coordinates specifying the relative orientation of the normal and light vectors are mapped to a one dimensional table of color variables, and color values are assigned to pixels from a one dimensional color map that is referenced to the same color variable table. The one dimensional color map represents light contributions from a single light source. One dimensional color maps for multiple light sources may be combined to form a 2D color map in which color values are referenced through a color variable and a light source identifier. In each case, the color mapping may be implemented using modified texture mapping techniques and hardware.

Figure 3:
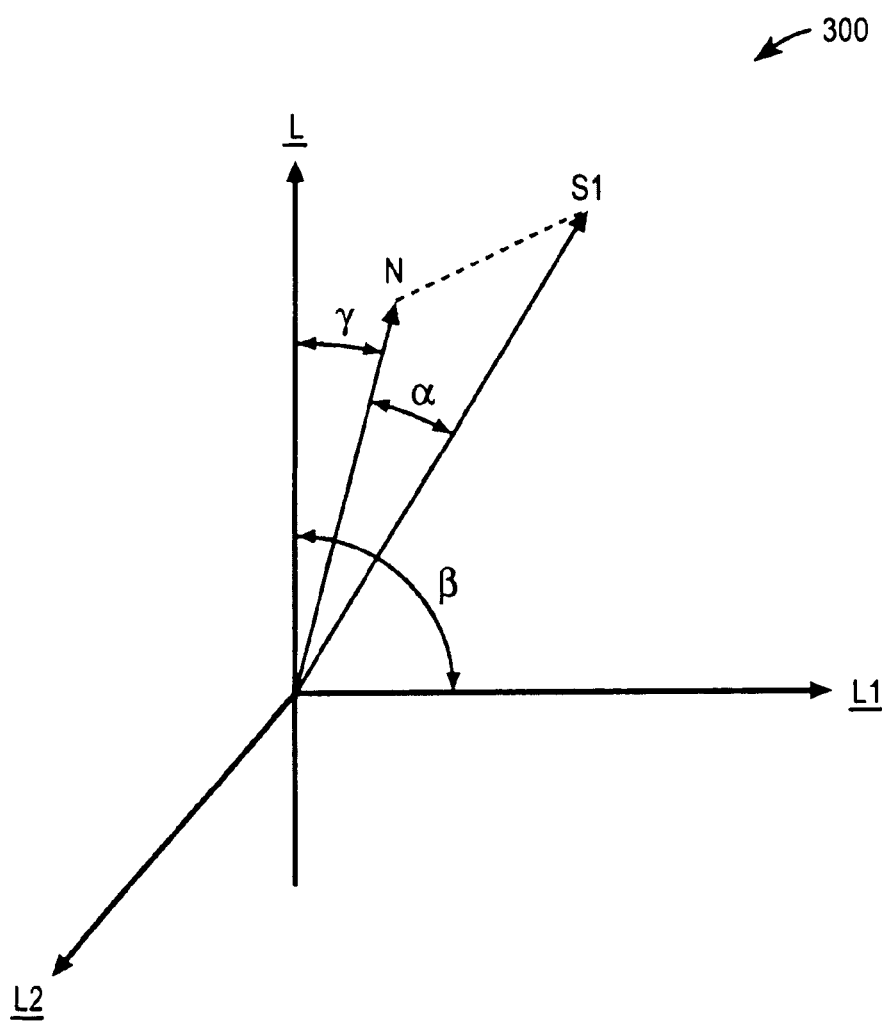
FIG. 3 shows the angle coordinates used to represent the orientation of a vector in accordance with the present invention.

FIG. 3 illustrates angle coordinates suitable for representing the orientation of a vector, e.g. vertex normal N, in accordance with one embodiment of the present invention. In this coordinate system, L is a unit vector that is directed towards a light source. L, L1, and L2 form the basis vectors for a cartesian coordinate system 300 in which a normal N is specified. S1 is a vector representing the projection of N onto a plane formed by the L and L1 basis vectors ("L–L1 plane"). A first angular variable, α, is defined as the angle between N and S1. A second angular variable, β, is defined as the angle between S1 and L1. In the disclosed coordinate system, α ranges from 0 to π/2 and β to range from 0 to π.

For one embodiment, color variables $u_c$ and $v_c$ are related to α and β through the following relationships:

$$u_c = \begin{cases} .5 - \alpha/\pi & \text{if } (N \cdot L_2) \geq 0 \\ .5 + \alpha/\pi & \text{if } (N \cdot L_2) < 0 \end{cases}$$ Eq. 2a $$v_c = \begin{cases} \beta/\pi & \text{if } (N \cdot L) \geq 0 \\ 1 - \beta/\pi & \text{if } (N \cdot L) < 0 \end{cases}$$ Eq. 2b A color map for this case (L=V, light source at infinity) may be precalculated in terms of the color variables as follows:

$$C(u_c, v_c) = M_a L_a + M_d L_d \Omega_L(u_c, v_c) + M_s L_s \Omega_H(u_c, v_c)^A$$ Eq. 3

Here, $\Omega_H(u_c, v_c)$ and $\Omega_H(u_c, v_c)$ are functions of color variables, $u_c$ and $v_c$, representing a range of normal orientations. For the above example, where L and H are parallel, $\Omega_L(u_c, v_c)$ and $\Omega_L(u_c, v_c)$ are equal and are the orientation-dependent portion of Eq. 3 becomes $(M_d L_d + M_s L_s)\Omega(u_c, v_c)$, where $\Omega(u_c, v_c)$ is given by:

$$\Omega(u_c, v_c) = \cos[\pi(0.5 + u_c)]\sin[2\pi v_c] = \sin[\pi u_c]\sin[2\pi v_c].$$ Eq. 4

Figure 4:
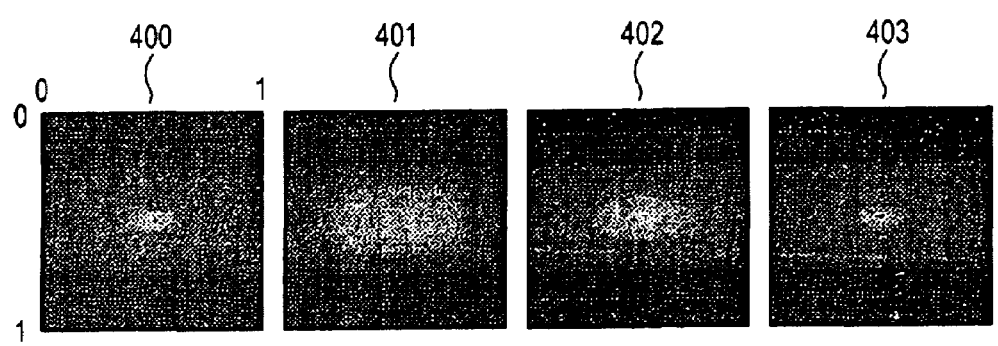
FIG. 4 is a color map comprising color values that are referenced through corresponding color variables.

Here, the subscript has been dropped from Ω. FIG. 4 shows color maps 400, 401, 402, 403 calculated using Eq. 4 with different values of the specular exponent A. In accordance with the present invention, color maps 400–403 are precalculated and referenced through color variables $u_c$ and $v_c$.

In order to assign color values from, e.g., color map 400 to the pixels representing the illuminated object, color variables are determined for each pixel of the component polygons. The starting point for determining pixel color variables for a given polygon is the angle coordinates α, β, of the polygon's vertex normals. Vertex values of the angle coordinates may be determined using standard transformation techniques, as discussed below in greater detail. During rendering, angle coordinates α, β are generated for each pixel from the corresponding vertex normal values. The angle coordinates α, β for each pixel are then converted to color variables $u_c$, $v_c$, and a corresponding color value is provided from color map 400.

Illumination data related to other vectors quantities may be readily accommodated in color map 400. For example, when V and L are not parallel, the orientation function, $\Omega_H(u_c, v_c)$ differs from $\Omega_L(u_c, v_c)$ and must be determined independently. The orientation of H in the coordinate system of FIG. 3 may be specified by angular coordinates, $\alpha_H$, $\beta_H$ (or corresponding color variables $u_{cH}$, $v_{cH}$), and the corresponding orientation function is given by:

$$\Omega_H(u_c, v_c) = \sin[\pi(u_c - u_{cH})]\sin[2\pi(v_c - v_{cH})].$$ Eq. 5

Since $u_{cH}$ and $v_{cH}$ are constants for a given illumination/viewing geometry, the sum of $M_s L_s \Omega_H(u_c, v_c)$ and $M_d L_d \Omega_L(u_c, v_c)$ be referenced through the same color variables to form a color map for the case where L and H are not parallel.

Similarly, where multiple light sources are present, the orientation of each additional light source, $L_i$, may be specified through angle coordinates, $\alpha_{Li}$, $\beta_{Li}$ (or their corresponding color variables, $u_{cLi}$, $v_{cLi}$). Diffuse terms for each additional light source may then be incorporated into color map 400 through a corresponding orientation function, $\Omega_{Li}(u_c, v_c)$, in which $u_c$, $v_c$, are offset by constant color variables, $u_{cLi}$, $v_{cLi}$ as in Eq. 5. Specular terms for each additional light source $\Omega_{Hi}(u_c, v_c)$ may be similarly incorporated for each $L_i$ that is not parallel to H.

One shortcoming of the coordinate system of FIG. 3 is that close normals may not correspond to close color texture coordinates. For example, if the viewing direction (V) corresponds to color variables near the edge of color map (FIG. 3), small changes in the viewing direction of the object may result in large changes in the color variables for normals on opposite sides of the origin (e.g. β=0). This can create a discontinuous appearance in those regions of the object that correspond to extreme color variables of the color map.

One method for addressing these discontinuities is to employ a coordinate system in which the defects, e.g.

discontinuities, are on polygons on the side of the object opposite to that being viewed, independent of the location of the light source(s). This may be accomplished, for example, in a coordinate system in which the normal angles are defined relative to the camera (viewer) direction rather than light source direction. In FIG. 3, this means that L is replaced by V, and the angle coordinates $\alpha$, $\beta$ refer to the direction of a normal or a light source, $L_j$, with respect to V.

As in the discussion of color map 400, a color map in the camera-fixed coordinate system is generated by sampling a range of normal orientations specified by, e.g., angle coordinates, $\alpha$, $\beta$. The set of sampled normals defines a unit sphere. The hemisphere visible to the viewer is mapped to a planar grid as follows:

$$u_c = \alpha/\pi$$

$$v_c = \beta/\pi \qquad \text{Eq. 6}$$

For one embodiment, the 2D color map or table includes diffuse lighting contributions from all light sources as a function of normal orientations specified by $u_c$, $v_c$. For specular lighting purposes, it is assumed that the central element of the 2D table (½, ½) represents a normal pointing directly into the *camera*. T*hus*, H can be established and specular contributions can be determined and added for all *lights*.

During rendering, the orientation of a pixel normal is interpolated from vertex values of $\alpha$, $\beta$, and converted to color variables $u_c$, $v_c$. The pixel color value is provided by the entry in the 2D table referenced by $u_c$, $v_c$. It is noted that since each pixel is treated independently, there are likely to be parallax errors, and pixels in shadow may be lit as if they were not in shadow.

A color map for multiple, non-local lights illuminating a polygon characterized by one set of material properties in the viewer-referenced coordinate system is calculated as follows:

$$C^1[u_c, v_c] = \sum_{j=0}^{N-1} (M_{aj}L_{aj} + M_{dj}L_{dj}(N_x[u_c, v_c] \cdot L_j) + M_{sj}L_{sj}(N_x[u_c, v_c] \cdot H_j)^A) \qquad \text{Eq. 7a}$$

$$C^2[u_c, v_c] = \sum_{j=0}^{N-1} (M_{aj}L_{aj} + M_{dj}L_{dj}(N_y[u_c, v_c] \cdot L_j) + M_{sj}L_{sj}(N_y[u_c, v_c] \cdot H_j)^A) \qquad \text{Eq. 7b}$$

Here, $L_j$ and $H_j$ are the light source and halfway vectors for light source (j) in the viewer-referenced coordinate system. For one embodiment of the present invention, $N_x[u_c,v_c]$ and $N_y[u_c,v_c]$ are a set of vectors that sample a range of orientations with respect V. $N_x[u_c,v_c]$ and $N_y[u_c,v_c]$ are given by the following equations:

$$N_x[u_c, v_c] = \begin{pmatrix} x_u \\ y_v \\ \sqrt{1 - x_u^2 - y_v^2} \end{pmatrix} \text{ if } (x_u^2 + y_v^2) < 1 \qquad \text{Eq. 8a}$$

$$N_x[u_c, v_c] = \begin{pmatrix} \dfrac{x_u}{\sqrt{x_u^2 + y_v^2}} \\ y_v \\ \sqrt{x_u^2 + y_v^2} \\ 0 \end{pmatrix} \text{ otherwise} \qquad \text{Eq. 8b}$$

$$N_y[u_c v_c] = \begin{pmatrix} x_u \\ -y_v \\ \sqrt{1 - x_u^2 - y_{vi}^2} \\ 0 \end{pmatrix} \text{ if } (x_u^2 + y_v^2) < 1 \qquad \text{Eq. 9a}$$

$$N_y[u_c v_c] = \begin{pmatrix} x_u \\ \sqrt{x_u^2 + y_v^2} \\ y_v \\ \sqrt{x_u^2 + y_v^2} \\ 0 \end{pmatrix} \text{ otherwise} \qquad \text{Eq. 9b}$$

In this embodiment, the color variables, $u_c$, $v_c$ are related to $x_u$, $y_v$, as follows:

$$x_u = 2u_c - 1 \qquad \text{Eq. 10a}$$

$$y_v = 2v_c - 1 \qquad \text{Eq. 10b}$$

The color map consists of the set of color values $C^1[u_c,v_c]$ and $C^2[u_c,v_c]$ for color variables $u_c$, $v_c$ between 0 and 1. The geometry intensive calculations of Eqs. 7a and 7b, are precalculated, e.g. prior to rendering, for each object that has the same lighting, camera, and material characteristics.

FIGS. 5A and 5B are color maps, $C^1$ and $C^2$, respectively, for the following material and light source characteristics for red, green, and blue (RGB) wavelengths:

$M_a$=(0.15, 0.03, 0.12)
$M_d$=(0.7, 0.12, 0.40)
$M_s$=(1.0, 1.0, 1.0)
$A_{mat}$=40
$L_a(0)=L_d(0)=L_s(0)$=(1, 1, 1)(white light)
$L_a(1)=L_d(1)=L_s(1)$=(0, 0, 1) (blue light)

$M_a$, $M_d$, and $M_s$, are material RGB color vectors for ambient, diffuse, and specular light, $A_{mat}$ is the specular exponent of the material, and $L_a(j)$, $L_d(j)$, and $L_s(j)$ are RGB color vectors for light source (j).

FIGS. 5C and 5D are color tables $C^1$ and $C^2$ for the following material and light source RGB characteristics:

$M_a$=(0.12, 0.09, 0.03)
$M_d$=(0.4, 0.37, 0.06)
$M_s$=(1.0, 0.80, 0.30)
$A_{mat}$=40
$L_a(0)=L_d(0)=L_s(0)$=(1, 1, 1) (white light)
$L_a(1)=L_d(1)=L_s(1)$=(0, 0, 1) (blue light).
$L_a(2)=L_d(2)=L_s(2)$=(0, 1, 0) (green light)
$L_0$=(1, 1, −1), $L_1$=(−1, −1, −1), $L_2$=(1, −1, −1).

Once the color map is calculated for given light source(s) and viewing geometry, angle coordinates are generated for the vertex vectors (N, L, H) of each polygon in the viewer-fixed coordinate system. Angle coordinates for pixel normals are then generated by interpolation from the vertex values and converted to corresponding color variables. Color values for the pixels may then be read from the color map through a relatively fast look-up operation.

For one embodiment of the present invention, vertex values of the angular coordinates in the viewer-fixed coordinate system are generated as follows. Let $M=\{M_{mn}\}$ represent a model view matrix for the object that is being imaged, and $n_{xi}$, $n_{yi}$, $n_{zi}$ represent the x, y, and z components of the normal vector of the $i^{th}$ vertex of a polygon ($n_i$). The model view matrix is the matrix that transforms the coordinates of points in the object from an object-fixed coordinate system (model coordinate system) to a camera-fixed coordinate system (view coordinate system). In the latter coordinate system, V is parallel to the z axis, and the x and y axes are in the plane of the computer monitor. In this embodiment, a normalized vertex normal m in the camera-fixed coordinate system is given by:

$$m = \frac{M \cdot n}{\|M \cdot n\|} \qquad \text{Eq. (11)}$$

The color variables of the $i^{th}$ vertex normal in this coordinate system are:

$$u_{ci}=M_{xi}, v_{ci}=m_{yi}, w_{ci}=m_{zi} \qquad \text{Eq. (12)}$$

The color variables for the polygon pixels may be generated from $\{m_{xi}, m_{yi}, m_{zi}\}$ using standard interpolation methods. These methods are described, for example, in Foley, van Dam, Feiner, and Hughes, *Computer Graphics Principles and Practice*, Addison Wesley, Reading Mass. (1996).

In the disclosed embodiment of the invention, the color value for a pixel is provided from color map $C^1$ or $C^2$, depending on the interpolated value of $m_z$. A color value is assigned to the pixel from $C^1$ when $m_z \geq 0$, and a color value is assigned to the pixel from color table $C^2$ when $m_z < 0$. $C^2$ is included in the discussion for completeness, since pixels that are mapped to color map $C^2$ are not visible when the object is transformed to the camera coordinate system described above.

FIGS. 6A–6E show a series of images generated using the method of the present invention. For comparison, the same images generated using Gouraud shading and Phong shading are shown adjacent to them. The method of the present invention allows the figures to be generated in approximately the same amount of time as required for the Gouraud shaded object, and in much shorter times than required for the Phong object. The images in FIGS. 6A–6E generated by the present invention have highlights that are superior to those of the corresponding Gouraud shaded images and comparable to those achieved using the far more expensive Phong shading technique.

Local lights are not readily treated with the color maps described above, since the orientation of the light source vector varies with pixel position in the polygon. Color maps in which only normal vector orientations are sampled, e.g. FIGS. 4 and 5, are inadequate when the light vector varies as well. Color maps that sample both normal and light vector orientations are expensive to calculate and require four color variables to reference one color value. Since the color value depends only on the relative orientation of N and L (when L and V are parallel), the computational cost of the four parameter color map unnecessary. The use of four color variables also eliminates the parallels with texture mapping provided by the present invention.

For one embodiment of the present invention, local lights are treated using a one dimensional color map for each local light source. Returning to FIG. 4, it is evident from the symmetry of color map 400 that a significant amount of redundant information is present. This follows from the fact that the only angle of significance in Eq. (4) when L and V are parallel is the angle γ between L and N (FIG. 3). For example, Eq. 4 for $\Omega(u_c, v_c)$ is equivalent to:

$$\text{Cos } \gamma = \text{Cos } \alpha \cdot \text{Sin } \beta. \qquad \text{Eq. 13}$$

A corresponding 1D color map may be generated from Eq. 8, with $\Omega(u_c, v_c)=\text{Cos } \gamma$.

Color values can not be determined unambiguously by interpolating γ because vector orientations require two angles to be fully specified. However, angle coordinates α and β can be interpolated for each vector of interest, and γ(or some function of γ) can be generated using Eq 12. Color values may be accessed from the one dimensional color map through γ or a corresponding color variable. For multiple local light sources, a one dimensional color map may be generated for each light source/material combination, with color values referenced by a corresponding color variable. The set of one dimensional color maps may be combined into a single two dimensional color map, with color values indexed by a color variable and light source ID. Since the composite color map is 2 dimensional, it is readily accommodated into the color (texture) mapping framework of the present invention.

Figure 7:
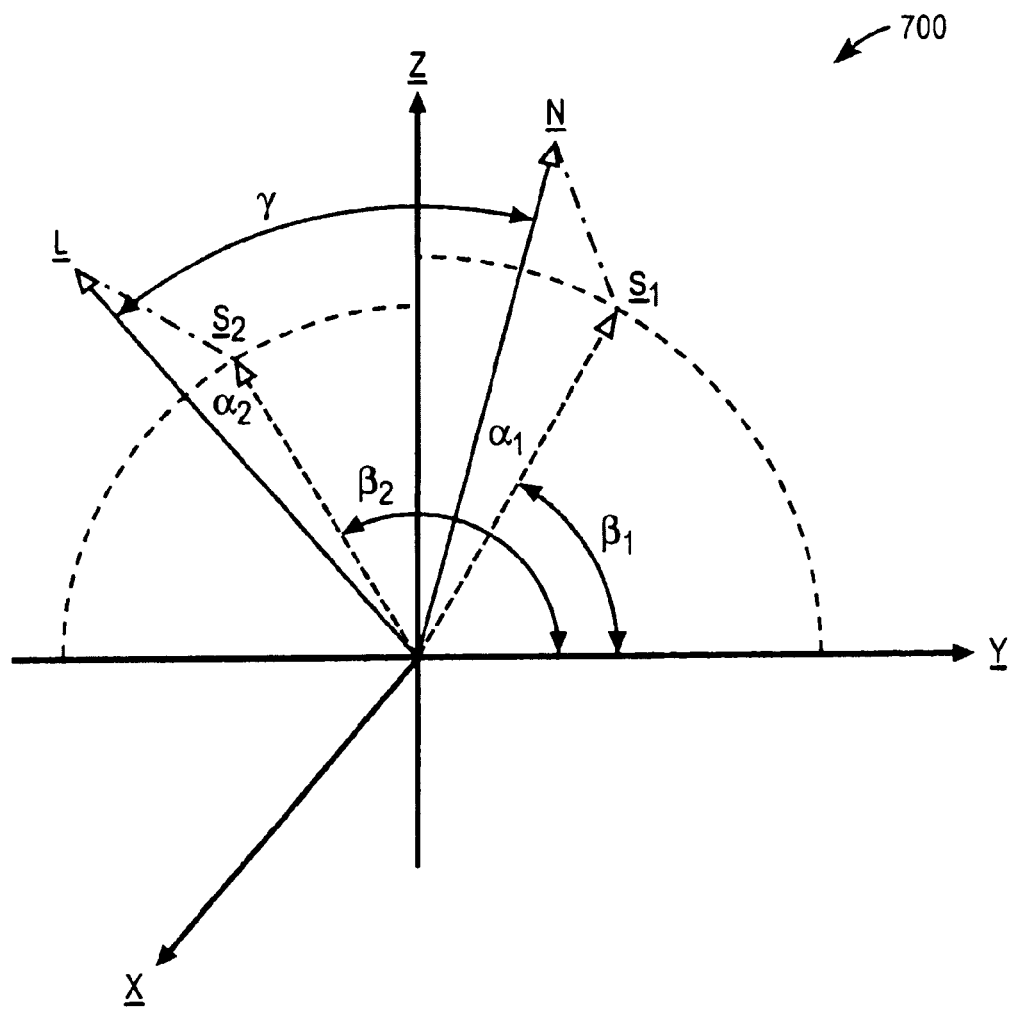
FIG. 7 is a coordinates system suitable for specifying light and halfway vectors when the light source is local to a polygon surface.

FIG. 7 shows a reference coordinate system defining angle coordinates $\alpha_1$, $\beta_1$, and $\alpha_2$, $\beta_2$ specifying the orientations of N and L, respectively, across a polygon. A similar approach applies to determining the relative orientation of N and V for the specular component of Eq. (1). In the disclosed coordinate system, Z is one of the basis vectors and Y is an axis that is perpendicular to Z. $S_1$ represents the vector formed by projecting N onto the Z, Y plane and $\alpha_1$ is the angle between N and the Z, Y plane. $S_1$ also makes an angle $\beta_1$ with the Y coordinate axis in the Z, Y plane. Similarly, $S_2$ represents the vector formed by projecting L onto the Z, Y plane, $\alpha_2$ is the angle between L and the Z, Y plane, and $\beta_2$ is the angle between $S_2$ and the Y coordinate axis in the Z, Y plane.

Using the reference coordinate system of FIG. 7, and the angle pairs $\alpha_1$, $\beta_1$, and $\alpha_2$, $\beta_2$ the vertex orientation of N and L may be specified unambiguously and interpolated to generate angle pairs $\alpha_1(s,t)$, $\beta_1(s,t)$ and $\alpha_2(s,t)$, $\beta_2(s,t)$, respectively, for pixels at locations (s, t). At each pixel location (s,t), angle pairs $\Delta\alpha(s,t)(=\alpha_1(s,t)-\alpha_2(s,t))$ and $\Delta\beta(s,t)(=\beta_1(s,t)-\beta_2(s,t))$ are determined. Since $\Delta\alpha(s,t)$ and $\Delta\beta(s,t)$ are perpendicular to each other, Cos γ is given by Cos Δα Sin Δβ, per Eq. 12.

Where both local and non-local light sources are present, a single color map may be determined for all non-local light sources in the manner described above, and a separate color map may be provided for each local light source. In each case, the color maps are precalculated for a sample of color variables and referenced according to the color variables. Color contributions for each pixel are then determined by interpolating the angle coordinates for each pixel in a polygon from the vertex values, determining corresponding color variables, and assigning the referenced color values from the appropriate color map.

The parallels between the present invention and texture mapping allow per-pixel shading to be implemented using standard, textures mapping hardware without perspective correction. In the present invention, the color map corresponds to the texture map that is being mapped to a polygon surface, and orientation parameters $u_c$, $v_c$ that reference color values in the color map correspond to the texture coordinates $u_T$, $v_T$ that reference texture values in the texture map. Where the graphics system supports more than one pipeline, per-pixel shading in accordance with the present invention can be carried out in parallel with texture mapping.

Figure 8:
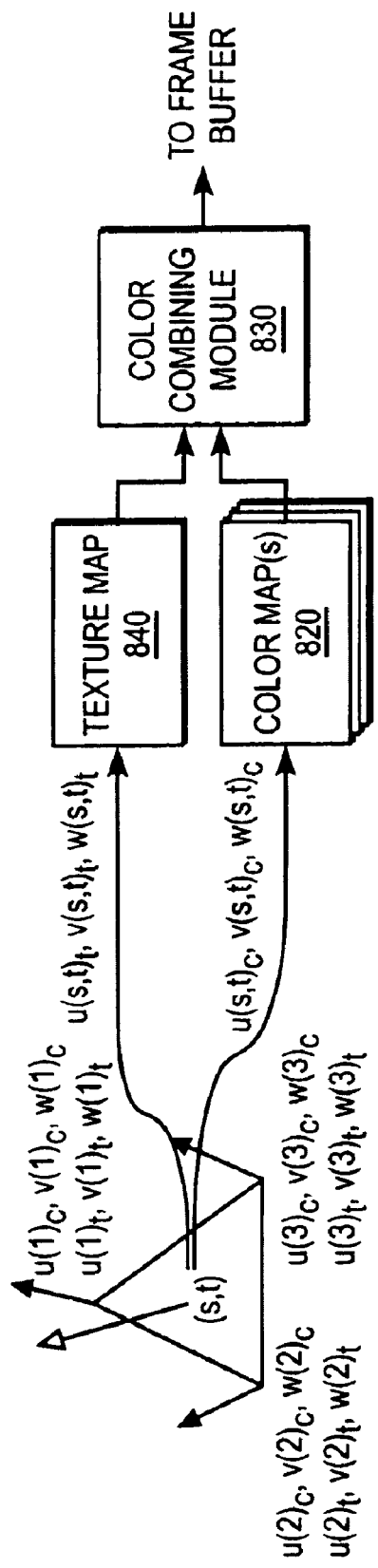
FIG. 8 is a block diagram of a system for implementing the per-pixel shading method of the present invention.

FIG. 8 is a block diagram indicating how the per-pixel shading method of the present invention may be implemented using texture mapping hardware available in most graphics systems. For purposes of illustration, each polygon vertex has associated color variables, $u_c$, $v_c$ $w_c$, corresponding to the angle coordinates of vertex vectors N, L, and H, as required by the particular illumination model, geometry, and simplifying assumptions. These parameters may be determined in the geometry stage of the graphics pipeline or, in the case of the normal vectors, specified in a model. Each polygon vertex is also shown having associated texture variables $u_t$, $V_t$, and $w_t$ for the case where texture mapping is implemented.

Color variables $u(s,t)_c$, $v(s,t)_c$, $w(s,t)_c$, are generated for each pixel location from the vertex values using the interpolation methods discussed above or their equivalents. The interpolated orientation parameters of a pixel are then used to access a color value stored in color map 820. The color value is provided to a color combining module 830 for further processing. Depending on the mix of local and non-local light sources, color values may be provided from different color maps 820.

Similarly, texture variables $u(s,t)_t$, $v(s,t)_t$, and $w(s,t)_t$, at pixel location s, t are generated from the vertex texture values, using standard interpolation methods. The interpolated texture values are then used to access texture data from texture map 840. The accessed texture map values are then provided to color combining module 830. Color combining module 830 receives per-pixel shading and texture data from color map(s) 820 and texture map 840 and combines the received shading and texture data into a suitable shading value for the pixel.

The per-pixel shading method of the present invention may also serve as the basis for an efficient approach to bump mapping. This approach to bump mapping employs a perturbation source, such as a mathematical function, an algorithm, or a bump map, to alter the angle coordinates (or color variables) of pixel normals before referring to the color map(s). For one embodiment of the invention, the perturbation source generates orientation perturbations, $\Delta\alpha$, $\Delta\beta$, that may be combined with the angle coordinates of a pixel to generate "perturbed angle coordinates". The perturbed angle coordinates are converted to color variables, which reference color values representing the perturbed normal orientation.

Figure 9:
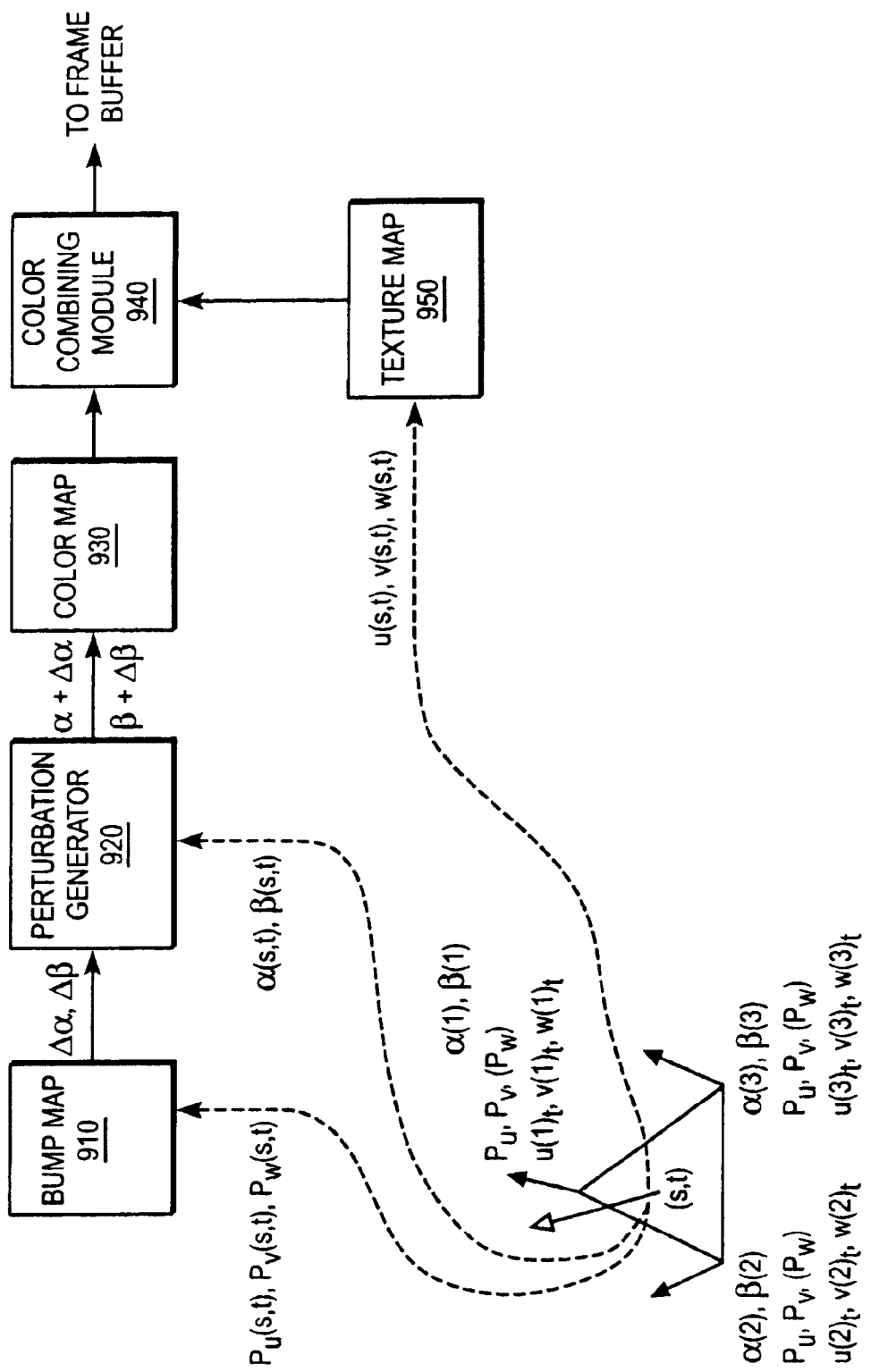
FIG. 9 is a block diagram of the system of FIG. 6 modified to implement a bump mapping method in accordance with the present invention.

FIG. 9 is a block diagram of a system 900 for implementing bump mapping in accordance with the present invention for the case in which the perturbation source is a bump map. System 900 includes a bump map 910, a perturbation generator 920, a color map 930, and a color combining module 940. Also shown is an optional texture map 950. Color map 930 and color combining module 940 are substantially as shown and described in conjunction with FIG. 8.

Bump map 910 is a precalculated set of orientation perturbation values ($\Delta\alpha$, $\Delta\beta$) that are referenced through bump coordinates, $P_u$, $P_v$, $P_w$, $P_w$ is shown in parenthesis since it is used only when perspective correction is to be included.

Pixel values of the bump coordinates are interpolated from vertex values of the bump coordinates during rendering. A bump value ($\Delta\alpha$, $\Delta\beta$) referenced by the interpolated bump coordinates is provided from bump map 910 for combination with the angle coordinates of the pixel. The perturbed angle coordinates are converted to color variables and the corresponding color values are provided by the color map.

In the embodiment of FIG. 9, perturbation generator 920 combines bump values ($\Delta\alpha$, $\Delta\beta$) with angle coordinates ($\alpha,\beta$) for a pixel to generate perturbed angle coordinates ($\alpha'=\alpha+\Delta\alpha$, $\beta'=\beta+\Delta\beta$). The perturbed angle coordinates are converted to color variables, which are then used to look up a color value in color map 930. The resulting color value is suitable to the perturbed orientation of the pixel's normal vector. As shown in FIG. 9, texture values may also be provided for a pixel from texture map 950 and combined with the color values from color map 930 by color combining module 940.

As noted above, sources other than a bump map may be used to provide the perturbations of the pixel normals. For example, one algorithm for generating perturbations computes the gradient of the color values for an image and converts the gradient to a bump value. Bump values may be generated and added to angle coordinates on the fly or they may be stored to a bump map and combined with angle coordinates on a subsequent pass through the image.

Figure 10:
FIGS. 10–11 show images generated using a bump mapping method in accordance with the present invention.
Figure 11:
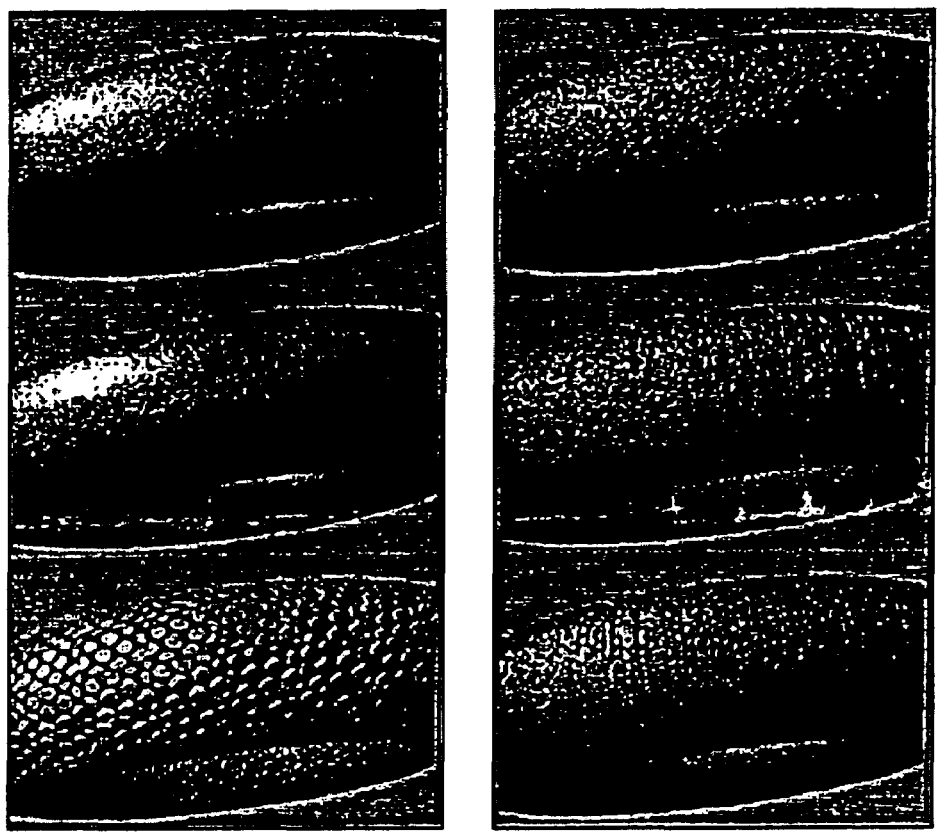

FIG. 10 shows images 1010 generated by applying the bump mapping method of the present invention. The image on the left is generated using the pixel color values of the central image for the altitudes (bumps) of its corresponding pixels. The image on the right is generated using color-weighted altitudes (linear combinations of the RGB values) derived from the pixel color values of the central image. FIG. 11 shows a series of images in which microrelief has been added using the bump-mapping method of the present invention.

There has thus been provided a per pixel shading system that is suitable for use in real time interactive graphics systems. Color values are precalculated for a sample of normal vector orientations specified by pairs of polar angle coordinates. The color values are collected in a color map and referenced by angle coordinates that have been scaled to a range of between 0 and 1 (scaled angle coordinates or color variables). Values of the angle coordinates are determined for the vertices of each polygon used to model the object to be shaded. During rendering, pixel angle coordinates are determined by interpolating angle coordinates from the vertex values. Bump features are generated by combining angle perturbations with the interpolated angle coordinates to generate modified angle coordinates. The angle perturbations for a pixel may be determined by interpolation from vertex values. The modified angle coordinates are converted to color variables, and a color value referenced by the color variables is assigned to the pixel. The method may be readily implemented using standard texture mapping hardware.

We claim:

1. A method for implementing bump mapping, comprising:

generating a table of color values for a geometry of a polygon in view of a light source and a viewing direction of the polygon, the table of color values to be referenced by orientation-dependent color variables;

determining vertex angle coordinates for a plurality of vertex vectors of the polygons, including a normal vector (N), a light source vector (L), and a halfway vector between the light source vector (H) and a viewing direction of the polygon (V);

interpolating the vertex angle coordinates with vertex values of the vertices of the polygon to provide angle coordinates for each pixel in the polygon, the angle coordinates representing a direction of the vertex vector at the pixel;

modifying the angle coordinates using a perturbation source to generate perturbed angle coordinates;

converting the perturbed angle coordinates to one or more color variables; and assigning the pixel a color value from the table of color values referenced by the one or more color variables, wherein table of color variables includes a first color variable ($u_c$) and a second color variable ($v_c$), wherein the first and second color variables are defined as:

$$u_c = \begin{cases} .5 - \alpha/\pi \text{ if } (N \cdot L_2) \geq 0 \\ .5 + \alpha/\pi \text{ if } (N \cdot L_2) < 0 \end{cases} \text{ and } v_c = \begin{cases} \beta/\pi \text{ if } (N \cdot L) \geq 0 \\ 1 - \beta/\pi \text{ if } (N \cdot L) < 0 \end{cases},$$

where L2 is a basis vector of a Cartesian coordinate system for L, wherein α represents an angle between N and a projection of N (S1) onto a plane represented by L and L2, and wherein β represents an angle between S1 and another basis vector of the Cartesian coordinate system (L1).

2. The method of claim 1, wherein modifying the angle coordinates includes:

generating angle perturbations based on bump coordinates of each vertex of the polygon; and combining the angle perturbations with the angle coordinates to generate the perturbed angle coordinates.

3. The method of claim 1, wherein the table of color variables is represented via a color map (C) defined as follows:

$$C(u_c, v_c) = M_a L_a + M_d L_d \Omega_L(u_c, v_c) + M_s L_s \Omega_H(u_c, v_c)^A,$$

wherein $M_a$, $M_d$, and $M_s$ represent characteristics of object material for ambient light, diffuse, and specular respectively wherein $\Omega_L$ and $\Omega_H$ are predetermined functions for L and H respectively based on $u_c$ and $v_c$ and A represents a specular exponent.

4. The method of claim 3, wherein if L and V are substantially in parallel, $\Omega_L$ and $\Omega_H$ are defined substantially identical defined as follows:

$$\Omega(u_c, v_c) = \cos[\pi(0.5+u_c)]\sin[2\pi v_c] = \sin[\pi u_c]\sin[2\pi v_c].$$

5. The method of claim 4, wherein if L and V are not substantially in parallel, $\Omega_H$ is defined as follows:

$$\Omega_H(u_c, v_c) = \sin[\pi(u_c-u_{cH})]\sin[2\pi(v_c-v_{cH})].$$

6. The method of claim 3, wherein if multiple lights are used to illuminating the polygon, the color map is defined as follows:

$$C^1[u_c, v_c] = \sum_{j=0}^{N-1} (M_{aj}L_{aj} + M_{dj}L_{dj}(N_x[u_c, v_c] \cdot L_j) + M_{sj}L_{sj}(N_x[u_c, v_c] \cdot H_j)^A)$$

-continued
and $$C^2[u_c, v_c] = \sum_{j=0}^{N-1} (M_{aj}L_{aj} + M_{dj}L_{dj}(N_y[u_c, v_c] \cdot L_j) + M_{sj}L_{sj}(N_y[u_c, v_c] \cdot H_j)^A),$$

wherein $N_x[u_c, v_c]$ and $N_y[u_c, v_c]$ are a set of vectors that sample a range of orientations with respect V, $N_x[u_c, v_c]$ are defined as follows:

$$N_x[u_c, v_c] = \begin{pmatrix} x_u \\ y_v \\ \sqrt{1 - x_u^2 - y_v^2} \end{pmatrix} \text{ if } (x_u^2 + y_v^2) < 1$$

$$N_x[u_c, v_c] = \begin{pmatrix} \frac{x_u}{\sqrt{x_u^2 + y_v^2}} \\ y_v \\ \sqrt{x_u^2 + y_v^2} \\ 0 \end{pmatrix} \text{ otherwise, and}$$

$$N_y[u_c v_c] = \begin{pmatrix} x_u \\ -y_v \\ \sqrt{1 - x_u^2 - y_{vi}^2} \\ 0 \end{pmatrix} \text{ if } (x_u^2 + y_v^2) < 1$$

$$N_y[u_c v_c] = \begin{pmatrix} \frac{x_u}{\sqrt{x_u^2 + y_v^2}} \\ y_v \\ \sqrt{x_u^2 + y_v^2} \\ 0 \end{pmatrix} \text{ otherwise.}$$

7. A graphics system comprising:

a geometry engine to associate vector orientation data with vertices of one or more polygons representing an object in an image;

a color map including color values for a sample of vector orientations, each color value to be referenced by one or more orientation dependent color variables;

a perturbation source to provide orientation perturbations; and a rendering engine to generate a table of color values for a geometry of a polygon in view of a light source and a viewing direction of the polygon, the table of color values to be referenced by orientation-dependent color variables, determine vertex angle coordinates for a plurality of vertex vectors of the polygon, including a normal vector (N), a light source vector (L), and a halfway vector between the light source vector (H) and a viewing direction of the polygon (V), interpolate the vertex angle coordinates with vertex values of the vertices of the polygon to provide angle coordinates for each pixel in the polygon, the angle coordinates representing a direction of the vertex vector at the pixel, modify the angle coordinates using a perturbation source to generate perturbed angle coordinates, convert the perturbed angle coordinates to one or more color variables, and assign the pixel a color value from the table of color values referenced by the one or more color variables, wherein table of color variables includes a first color variable ($u_C$) and a second color variable ($v_c$), wherein the first and second color variables are defined as:

$$u_c = \begin{Bmatrix} .5 - \alpha/\pi & \text{if } (N \cdot L_2) \geq 0 \\ .5 + \alpha/\pi & \text{if } (N \cdot L_2) < 0 \end{Bmatrix} \text{ and } v_c = \begin{Bmatrix} \beta/\pi & \text{if } (N \cdot L) \geq 0 \\ 1 - \beta/\pi & \text{if } (N \cdot L) < 0 \end{Bmatrix},$$

where L2 is a basis vector of a Cartesian coordinate system for L, wherein α represents an angle between N and a projection of N (S1) onto a plane represented by L and L2, and wherein β represents an angle between S1 and another basis vector of the Cartesian coordinate system (L1).

8. The graphics system of claim 7, wherein the table of color variables is represented via a color map (C) defined as follows:

$$C(u_c,v_c) = M_a L_a + M_d L_s \Omega_L(u_c,v_c) + M_s L_s \Omega_H(u_c,v_c)^A,$$

wherein $M_a$, Md, and Ms represent characteristics of object material for ambient light, diffuse, and specular respectively, wherein $\Omega_L$ and $\Omega_H$ are predetermined functions for L and H respectively based on $u_c$ and $v_c$, and A represents a specular exponent.

9. The graphics system of claim 8, wherein if L and V are substantially in parallel, $\Omega_L$ and $\Omega_H$ are defined substantially identical defined as follows:

$$\Omega(u_c, v_c) = \cos[\pi(0.5+u_c)]\sin[2\pi v_c] = \sin[\pi u_c)]\sin[2\pi v_c].$$

10. The graphics system of claim 9, wherein if L and V are not substantially in parallel, $\Omega_H$ is defined as follows:

$$\Omega_H(u_c, v_c) = \sin[\pi(u_c - u_{cH})]\sin[2\pi(v_c - v_{cH})].$$

11. The graphics system of claim 8, wherein if multiple lights are used to illuminating the polygon, the color map is defined as follows:

$$C^1[u_c, v_c] = \sum_{j=0}^{N-1}(M_{aj}L_{aj} + M_{dj}L_{dj}(N_x[u_c, v_c] \cdot L_j) + M_{sj}L_{sj}(N_x[u_c, v_c] \cdot H_j)^A)$$

and $$C^2[u_c, v_c] = \sum_{j=0}^{N-1}(M_{aj}L_{aj} + M_{dj}L_{dj}(N_y[u_c, v_c] \cdot L_j) + M_{sj}L_{sj}(N_y[u_c, v_c] \cdot H_j)^A),$$

wherein $N_x[u_c,v_c]$ and $N_y[u_c,v_c]$ are a set of vectors that sample a range of orientations with respect V, $N_x[u_c,v_c]$ and $N_y[u_c,v_c]$ are defined as follows:

$$N_X[u_c, v_c] = \begin{pmatrix} x_u \\ y_v \\ \sqrt{1 - x_u^2 - y_v^2} \end{pmatrix} \text{ if } (x_u^2 + y_v^2) < 1$$

$$N_x[u_c, v_c] = \begin{pmatrix} \frac{x_u}{\sqrt{x_u^2 + y_v^2}} \\ \frac{y_v}{\sqrt{x_u^2 + y_v^2}} \\ 0 \end{pmatrix} \text{ otherwise, and}$$

$$N_y[u_c v_c] = \begin{pmatrix} x_u \\ -y_v \\ \sqrt{1 - x_u^2 - y_{vi}^2} \\ 0 \end{pmatrix} \text{ if } (x_u^2 + y_v^2) < 1$$

$$N_y[u_c v_c] = \begin{pmatrix} x_u \\ \frac{\sqrt{x_u^2 + y_v^2}}{y_v} \\ \sqrt{x_u^2 + y_v^2} \\ 0 \end{pmatrix} \text{ otherwise.}$$

12. A machine readable medium on which are stored instructions that are executable by a system to implement a method for assigning a color value to an image pixel, the method comprising:

generating a table of color values for a geometry of a polygon in view of a light source and a viewing direction of the polygon, the table of color values to be referenced by orientation-dependent color variables, determining vertex angle coordinates for a plurality of vertex vectors of the polygons including a normal vector (N), a light source vector (L), and a halfway vector between the light source vector (H) and a viewing direction of the polygon (V), interpolating the vertex angle coordinates with vertex values of the vertices of the polygon to provide angle coordinates for each pixel in the polygon, the angle coordinates representing a direction of the vertex vector at the pixel, modifying the angle coordinates using a perturbation source to generate perturbed angle coordinates, converting the perturbed angle coordinates to one or more color variables, and assigning the pixel a color value from the table of color values referenced by the one or more color variables, wherein table of color variables includes a first color variable ($u_c$) and a second color variable ($v_c$), wherein the first and second color variables are defined as:

$$u_c = \begin{Bmatrix} .5 - \alpha/\pi & \text{if } (N \cdot L_2) \geq 0 \\ .5 + \alpha/\pi & \text{if } (N \cdot L_2) < 0 \end{Bmatrix} \text{ and } v_c = \begin{Bmatrix} \beta/\pi & \text{if } (N \cdot L) \geq 0 \\ 1 - \beta/\pi & \text{if } (N \cdot L) < 0 \end{Bmatrix},$$

where L2 is a basis vector of a Cartesian coordinate system for L, wherein a represents an angle between N and a projection of N (S1) onto a plane represented by L and L2, and wherein β represents an angle between S1 and another basis vector of the Cartesian coordinate system (L1).

13. The machine readable medium of claim 12, wherein modifying angle coordinates comprises:
  generating the angle perturbations for the pixel; and
  combining the angle perturbations with the angle coordinates to form perturbed angle coordinates.

14. The machine readable storage medium of claim 12, wherein the table of color variables is represented via a color map (C) defined as follows:

$$C(u_c, v_c) = M_a L_a + M_d L_d \Omega_L(u_c, v_c) + M_s L_s \Omega_H(u_c, v_c)^A,$$

wherein $M_a$, Md, and Ms represent characteristics of object material for ambient light, diffuse, and specular respectively, wherein $\Omega_L$ and $\Omega_H$ are predetermined functions for L and H respectively based on $u_c$ and $v_c$, and A represents a specular exponent.

15. A graphics system comprising:
  means for associating a plurality of vertex angles with each vertex of one or more polygons representing an object in an image;
  means for indicating color values for a sample of vector orientations, each color value to be referenced by one or more orientation dependent color variables;
  means for providing orientation perturbations; and
  means for converting the plurality of vertex angles for each polygon to a plurality of angle coordinates and perturbation coordinates for each pixel in the polygon, including a normal vector (N), a light source vector (L), and a halfway vector between the light source vector (H) and a viewing direction of the polygon (V); and
  means for combining the angle and perturbation coordinates to generate a perturbed color variable and to provide at least one of the color values for each pixel with the perturbed color variable,
  wherein the color variables include a first color variable ($u_c$) and a second color variable ($v_c$), wherein the first and second color variables are defined as:

$$u_c = \begin{Bmatrix} .5 - \alpha/\pi \text{ if } (N \cdot L_2) \geq 0 \\ .5 + \alpha/\pi \text{ if } (N \cdot L_2) < 0 \end{Bmatrix} \text{ and } v_c = \begin{Bmatrix} \beta/\pi \text{ if } (N \cdot L) \geq 0 \\ 1 - \beta/\pi \text{ if } (N \cdot L) < 0 \end{Bmatrix},$$

where L2 is a basis vector of a Cartesian coordinate system for L, wherein α represents an angle between N and a projection of N (S1) onto a plane represented by L and L2, and wherein β represents an angle between S1 and another basis vector of the Cartesian coordinate system (L1).

16. The graphics system of claim 15, wherein the providing means is a bump map including angle perturbations referenced by the perturbation coordinates.

17. The graphics system of claim 16, wherein the combining means includes a generator that combines the angle coordinates and angle perturbations into perturbed color coordinates.

18. A system comprising:
  a graphics pipeline; and
  a memory, in which are stored instructions that are executable by the graphics pipeline to implement a method for assigning a color value to a pixel, the method comprising:
    generating color values for a sample of vector orientations, each color value being associated with first and second angle coordinates representing a corresponding vector orientation;
    determining a pair of vertex angle coordinates for each vertex vector of a polygon that includes the pixel, including a normal vector (N), a light source vector (L), and a halfway vector between the light source vector (N) and a viewing direction of the polygon (V);
    interpolating the pairs of vertex angle coordinates to provide first and second angle coordinates for the pixel;
    perturbing the first and second angle coordinates to provide modified first and second angle coordinates; and
    retrieving a color value for the pixel according to the perturbed first and second angle coordinates,
    wherein the color variables include a first color variable ($u_c$) and a second color variable ($v_c$), wherein the first and second color variables are defined as:

$$u_c = \begin{Bmatrix} .5 - \alpha/\pi \text{ if } (N \cdot L_2) \geq 0 \\ .5 + \alpha/\pi \text{ if } (N \cdot L_2) < 0 \end{Bmatrix} \text{ and } v_c = \begin{Bmatrix} \beta/\pi \text{ if } (N \cdot L) \geq 0 \\ 1 - \beta/\pi \text{ if } (N \cdot L) < 0 \end{Bmatrix},$$

where L2 is a basis vector of a Cartesian coordinate system for L, wherein α represents an angle between N and a projection of N (S1) onto a plane represented by L and L2, and wherein β represents an angle between S1 and another basis vector of the Cartesian coordinate system (L1).

19. The system of claim 18, wherein each color value is associated with first and second angle coordinates through one or more angle coordinates that index the color value.

20. The system of claim 18, wherein the graphics pipeline includes texture mapping hardware and the color values are accessed using the texture mapping hardware.

21. A computer implemented method comprising:
  generating a plurality of color values for a sample of vector orientations in view of a light source and a viewing direction of a polygon that includes a pixel, the plurality of color values being stored in a color table referenced by one or more color variables;
  determining a pair of angle coordinates for the pixel from a set of one or more vertex vectors of the polygon including at least one of a normal vector (N), a light source vector (L), and a halfway vector (H) between the light source vector and the viewing direction (V) of the polygon;
  interpolating the pair of angle coordinates with vertex values associated with the vertices of the polygon;
  modifying the interpolated pair of angle coordinates with a perturbation value;
  determining a color variable with the modified interpolated pair of angle coordinates;
  assigning at least one of the plurality of color values to the pixel from the color table referenced by the color variable,
  wherein the color variables include a first color variable ($u_c$) and a second color variable ($v_c$) wherein the first and second color variables are defined as:

$$u_c = \begin{Bmatrix} .5 - \alpha/\pi \text{ if } (N \cdot L_2) \geq 0 \\ .5 + \alpha/\pi \text{ if } (N \cdot L_2) < 0 \end{Bmatrix} \text{ and } v_c = \begin{Bmatrix} \beta/\pi \text{ if } (N \cdot L) \geq 0 \\ 1 - \beta/\pi \text{ if } (N \cdot L) \geq 0 \end{Bmatrix},$$

where L2 is a basis vector of a Cartesian coordinate system for L, wherein a represents an angle between N and a projection of N (S1) onto a plane represented by L and L2, and wherein D represents an angle between S1 and another basis vector of the Cartesian coordinate system (L1).

* * * * *

UNITED STATES PATENT AND TRADEMARK OFFICE
CERTIFICATE OF CORRECTION

PATENT NO. : 7,034,827 B2
APPLICATION NO. : 09/118945
DATED : April 25, 2006
INVENTOR(S) : Hurley et al.

It is certified that error appears in the above-identified patent and that said Letters Patent is hereby corrected as shown below:

In column 1, at line 23, delete "$1/2I$" and insert --$1/2$--.

In column 12, at line 1, delete "$P_{w,}$" and insert --$P_w$.--.

In column 13, at line 2, delete "polygons," and insert --polygon,--.

In column 13, at line 27, delete "a" and insert --$\alpha$--.

In column 13, at line 41, delete first occurrence of "$(U_c V_c)$" and insert --$(U_c, V_c)$--.

In column 14, at line 12, delete "V," and insert --V.--.

In column 14, at line 12, after "$N_x[(U_c, V_c)]$" insert --and $N_y[(U_c, V_c)]$--.

In column 15, at line 28, delete first occurrence of "$L_8$" and insert --$L_d$--.

In column 15, at line 66, delete "V," and insert --V.--.

In column 16, at line 38, delete "polygons" and insert --polygon,--.

In column 18, at line 63, delete "D" and insert --$\beta$--.

Signed and Sealed this

Fifteenth Day of July, 2008

JON W. DUDAS
*Director of the United States Patent and Trademark Office*